US012791577B2

(12) United States Patent
Habets et al.

(10) Patent No.: US 12,791,577 B2
(45) Date of Patent: Nov. 10, 2026

(54) METHOD AND AN APPARATUS FOR CHARACTERIZING AN AIRFLOW

(71) Applicant: Fraunhofer-Gesellschaft zur Förderung der angewandten Forschung e.V., Munich (DE)

(72) Inventors: Emanuel Habets, Erlangen (DE); Daniele Mirabilii, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 847 days.

(21) Appl. No.: 17/511,812

(22) Filed: Oct. 27, 2021

(65) Prior Publication Data

US 2022/0050123 A1 Feb. 17, 2022

Related U.S. Application Data

(63) Continuation of application No. PCT/EP2020/062078, filed on Apr. 30, 2020.

(30) Foreign Application Priority Data

May 3, 2019 (EP) .................................... 19172590

(51) Int. Cl.
*G01P 5/24* (2006.01)
*H04R 3/00* (2006.01)

(52) U.S. Cl.
CPC ................ *G01P 5/24* (2013.01); *H04R 3/005* (2013.01)

(58) Field of Classification Search
CPC .................................. G01P 5/24; H04R 3/005
See application file for complete search history.

(56) References Cited

U.S. PATENT DOCUMENTS

| | | | | |
|---|---|---|---|---|
| 3,020,963 A | | 2/1962 | Hakkarinen | |
| 5,046,360 A | | 9/1991 | Hedberg | |
| 5,343,744 A | | 9/1994 | Ammann | |
| 5,568,404 A | * | 10/1996 | Strumolo | G06F 30/15 702/140 |
| 6,601,447 B1 | | 8/2003 | Loucks | |
| 6,895,812 B2 | | 5/2005 | Dahlberg | |

(Continued)

FOREIGN PATENT DOCUMENTS

| | | | |
|---|---|---|---|
| CN | 106645792 | A | 5/2017 |
| EP | 1 994 788 | A2 | 11/2008 |

(Continued)

OTHER PUBLICATIONS

Mirabilii et al., "Simulating Multi-channel Wind Noise Based on the Corcos Model," Jul. 23, 2018. pp. 1-5. (Year: 2018).*

(Continued)

*Primary Examiner* — Ricky Go
(74) *Attorney, Agent, or Firm* — McClure, Qualey & Rodack, LLP

(57) ABSTRACT

What is described is a method for charactering an airflow, having the following steps: receiving acoustic signals generated by the airflow by means of a microphone array; extracting a characteristic information from the acoustic signals; determining an information on the airflow based on the characteristic information.

20 Claims, 10 Drawing Sheets

(56) References Cited

U.S. PATENT DOCUMENTS

| | | | | |
|---|---|---|---|---|
| 8,576,666 | B1 * | 11/2013 | Foley | G01L 11/04 73/147 |
| 2003/0147538 | A1 * | 8/2003 | Elko | H04R 3/005 381/91 |
| 2005/0131591 | A1 * | 6/2005 | Drutowski | G01P 13/025 701/5 |
| 2009/0175466 | A1 * | 7/2009 | Elko | H04R 3/04 381/94.1 |
| 2015/0316029 | A1 * | 11/2015 | Altmikus | F03D 80/00 29/889.7 |
| 2017/0158347 | A1 | 6/2017 | Anderson et al. | |
| 2018/0062393 | A1 | 3/2018 | Bou et al. | |

FOREIGN PATENT DOCUMENTS

| | | | |
|---|---|---|---|
| JP | H06-303689 | A | 10/1994 |
| JP | 3110201 | B2 | 11/2000 |
| RU | 2 062 988 | C1 | 6/1996 |
| WO | 2007/106399 | A1 | 9/2007 |

OTHER PUBLICATIONS

International Search Report and Written Opinion issued in application No. PCT/EP2020/062078.

Pindado, S., et al.; "Analysis of calibration results from cup and propeller anemometers. Influence on wind turbine Annual Energy Production (AEP) calculations;" Wind Energy; 2011; pp. 119-132.

Pindado, S., et al.; "The cup anemometer, a fundamental meteorological instrument for the wind energy industry. Research at the IDR/UPM Institute;" Sensors; 2014; pp. 21418-21452.

Kristensen, L.; "Cups, props and vanes;" Røskilde, Denmark: Risø National Laboratory; Aug. 1994; pp. 1-39.

Westermann, D.; "Overspeeding Measurements of Cup Anemometers Compared to a Simple Numerical Model;" Deutsches Windenergie-Institut gemeinnutzige GmbH; Aug. 1996; pp. 56-63.

Abstract of "Overspeeding Measurements of Cup Anemometers Compared to a Simple Numerical Model" p. 1 of publication.

Nelke, C.M., et al.; "Measurements, analysis and simulation of wind noise signals for mobile communication devices;" Proc. Intl. Workshop Acoust. Echo Noise Control (IWAENC); 2014; pp. 327-331.

Schwartz, O., et al.; "A recursive Expectation-Maximization algorithm for online multi-microphone noise reduction;" Proc. Signal Processing Conference (EUSIPCO); 2018; pp. 1542-1546.

Mirabilii, D., et al.; "Simulating multi-channel wind noise based on the Corcos model;" Proc. Intl. Workshop Acoust. Echo Noise Control (IWAENC); Sep. 2018; pp. 560-564.

Corcos, G.M.; "The structure of the turbulent pressure field in boundary-layer flows;" Journal of Fluid Mechanics; vol. 18; No. 3; 1964; pp. 353-378.

Mellen, R.H.; "On modeling convective turbulence;" The Journal of Acoustical Society of America; vol. 88; No. 6; Jan. 1990; pp. 2891-2893.

Chase, D.M.; "Modeling the wavevector-frequency spectrum of turbulent boundary layer wall pressure;" Journal of Sound and Vibration; vol. 70; Issue I; 1980; pp. 29-67.

Williams, J.E.F.; "Boundary-layer pressures and the Corcos model: a development to incorporate low wavenumber constraint;" Journal of Fluid Mechanics; vol. 125; 1982; pp. 9-25.

Caiazzo, A., et al.; "A generalized Corcos model for modelling turbulent boundary layer wall pressure fluctuation;" Journal of Sound and Vibration; vol. 372, Jan. 2016; pp. 192-210.

Mirabilii, D., et al.; "Multi-channel Wind Noise Reduction Using the Corcos Model;" ICASSP; IEEE International Conference on Acoustics, Speech and Signal Processing (ICASSP); IEEE; 2019; pp. 646-650.

Chinese language office action dated Dec. 6, 2023, issued in application No. CN 202080049167.0.

Mirabilii, D., et al.; "Multi-Channel Wind Noise Reduction Using the Corcos Model;" International Conference on Acoustics, Speech and Signal Processing ICASSP; Apr. 2019; pp. 1-5.

European office action dated Jun. 6, 2023, issued in application No. EP 20728 674.1.

Russian language Office Action dated Apr. 4, 2022, issued in application No. RU 2021135404.

English language translation of Russian Office Action dated Apr. 4, 2022, issued in application No. RU 2021135404.

Mirabilii, D., et al.; "Multi-channel Wind Noise Reduction Using the Corcos Model;" ICASSP 2019—2019 IEEE International Conference on Acoustics, Speech and Signal Processing (ICASSP); pp. 646-650.

Japanese language Notice of Allowance dated Nov. 1, 2022, issued in application No. JP 2021-565062.

Smolyakov, A.B., et al.; "Atmos 22 Ultrasonic Anemometer;" Meter Environment.

English language translation of abstract of "Atmos 22 Ultrasonic Anemometer".

* cited by examiner

| estimated speed [km/h] | true speed [km/h] | estimated direction [°] | true direction [°] |
|---|---|---|---|
| 7.6 | 7.7 | 193 | 192 |
| 7.6 | 8.6 | 197 | 198 |
| 6.1 | 6.5 | 197 | 184 |
| 8.1 | 8.3 | 193 | 198 |
| 7.2 | 7.7 | 201 | 190 |
| 6.5 | 7.2 | 192 | 192 |
| 8.1 | 8.6 | 195 | 196 |
| 8.1 | 8.6 | 193 | 196 |
| 6.5 | 7.9 | 197 | 192 |
| 6.2 | 7.9 | 199 | 192 |
| 6.5 | 7.8 | 196 | 195 |
| 7.1 | 7.9 | 196 | 198 |
| 7.9 | 8.1 | 201 | 198 |
| 6.8 | 6.8 | 63 | 55 |
| 7.5 | 6.8 | 60 | 69 |
| 6.1 | 6.2 | 61 | 48 |
| 7.6 | 7.4 | 61 | 50 |
| 6.1 | 6.6 | 135 | 138 |
| 6.1 | 5.6 | 133 | 136 |
| 7.9 | 8.7 | 132 | 133 |
| 6.5 | 7.6 | 141 | 134 |
| 5.8 | 6.3 | 125 | 131 |
| 5.8 | 7.0 | 117 | 124 |
| 5.0 | 4.6 | 134 | 136 |
| 5.9 | 6.8 | 141 | 136 |

Fig. 9

METHOD AND AN APPARATUS FOR CHARACTERIZING AN AIRFLOW

CROSS-REFERENCE TO RELATED APPLICATIONS

This application is a continuation of copending International Application No. PCT/EP2020/062078, filed Apr. 30, 2020, which is incorporated herein by reference in its entirety, and additionally claims priority from European Application No. 19172590.2, filed May 3, 2019, which is also incorporated herein by reference in its entirety.

BACKGROUND OF THE INVENTION

Embodiments of the present invention are directed to a method for characterizing an airflow and a corresponding apparatus. In general, the invention is in the field of acoustic analysis, spatial sound recording and microphone array signal processing. In particular, it relates to recorded wind noise generated by turbulent airflows in the proximity of the microphone.

Many applications require reliable measures of an airflow speed and direction, e.g., weather stations, wind turbine/mines/airfield monitoring and smart homes. The accuracy of such measures is vital, especially in safety critical systems. The measurement can be related to constrained (duct/pipe flows) or unconstrained (meteorological wind) air streams. The instrument employed for measuring the airflow speed is named anemometer, while the airflow direction is measured by the so-called wind vane. If both instruments are integrated into a single system, it is generally called vane anemometer.

The implementation of an anemometer is based on technologies exploiting different physical principles, which can be roughly categorized in:

1 Mechanical
2. Ultrasonic
3. Thermal
4. Laser-based

However, each of the above-listed device typology suffers from diverse drawbacks, from non-scalability to high cost or frequent maintenance. An overview of the state-of-the-art is provided in Section 2.

The following subsections summarize existing approaches to measure the speed and the direction of airflows, ordered from the most to the least common device.

Mechanical Anemometer

The simplest but most used anemometer is the so-called cup anemometer [Pindado 2011], where three or four hemispherical cups connected through horizontal arms at equal angles rotate around a vertical shaft when exposed to the wind. Computing the number of rotations of the cups over a determined time interval yields the average wind speed. The number or rotations is generally computed electronically, through a reed switch that triggers one or more impulses as soon as a rotation is completed. The cup anemometer presents a linear relation between the wind speed U and the rotation frequency f, as follows $$U=\gamma\cdot f+\beta$$

where γ and β are calibration coefficients, which are dependent on the geometry of the device and defined during the calibration process. More accurate analytical models can be found in [Pindado 2014].

The propeller anemometer is similar to the cup anemometer, since the equations related to its dynamics are the same of the cup anemometer [Kristensen 1994], except for his rotation axis being horizontal. One practical example of a propeller anemometer is the commercial handheld anemometer.

A typical cup or propeller anemometer is not sufficient to resolve the wind direction. A wind vane is a mechanical instrument used for measuring the wind direction by means of a vertical blade which orientates towards the position of least wind resistance. The direction is generally computed electronically through reed switches and resistors uniformly arranged in a circle: the mechanical blade is such that activates one or two switches depending on its position. Each switch is connected to a resistor with a different value with respect to the others, so that different wind directions are mapped to different resistance values.

The so-called vane anemometer or windmill anemometer combines the propeller anemometer with a wind vane, so that both speed and direction can be measured with a single instrument. The mechanical (rotating) anemometers are relatively cheap and easy to install, but the moving parts suffer from inertial latency and wind flow obstructions caused by the geometry of such devices. For instance, a mechanical anemometer has a finite time constant (response time) due to the start-up torque of the moving parts (cups and vane): rapid changes in wind direction or fast gusts cannot be measured instantaneously.

For this reason, most of the devices available in the market can measure not less than 5-seconds long wind gusts. Moreover, a phenomenon called over-speeding [Westermann 1996], which can be described as the relative slow response for a decelerating flow with respect to an accelerating one, can lead to an overestimation of the wind flow when its mean velocity decays. These devices also require constant maintenance, especially when exposed to low temperature or dusty environments, when ice or dirt considerably increase the friction during the rotation. Finally, the relatively large size of mechanical anemometers and the requirement of separate sensors for measuring speed and direction lead to a non-scalability and a hard integration in commercial device like smartphones or cameras, as well as a displeasing esthetic. Examples of mechanical anemometer can be found in [Hakkarinen 1962] and [Dahlberg 2005].

Ultrasonic Anemometer

The ultrasonic (or sonic or acoustic) anemometer provides an accurate and instantaneous measurement of both wind speed and direction, with an increased detection range with respect to the widely used cup anemometers. It practically consists of ultrasonic transducers that respectively emit and receive ultrasonic impulses or continuous wave (or their combination) whose frequency is above 20 kHz. The term acoustic is therefore related to ultrasonic sound waves. For the first approach, it is possible to resolve the wind speed based on the time interval occurring between the emission and the reception of the impulses. For the second approach, the propagation time is computed by measuring the phase difference between the transmitted and the received signals.

The sound propagates with a specific velocity c depending on the temperature, assuming dry air (0% humidity), following the relation $$c=331.3\frac{m}{s}\cdot\sqrt{\frac{T_K}{273.125^\circ\,\mathrm{C.}}}$$

where $T_K$ is the air temperature in Kelvin. In absence of flow, when a sound transmitter (speaker) emits waves propagating with velocity c, the receiver (microphone) detects the impulse or the phase difference after an approximately constant time interval, since the distance between the sensors is fixed. The wind flow affects the propagation time of the sonic waves: if the wind presents the same direction of the sound wave, the time interval between the transmission and the reception will be shorter, while it will be longer for opposite directions. It is possible to resolve the wind speed based on the difference between the constant time interval in absence of any flow and the measured time interval. When more than three transducers are employed it is possible to resolve also the wind direction, through a vector triangulation which exploits the composite transducer-propagation times occurring along the different transducer propagation paths. Each measured propagation time associated to one particular propagation path uniquely defines a wind speed vector: combining the three or more wind speed vectors (one for each propagation path) leads to a resultant vector whose magnitude and orientation indicate the wind speed and direction respectively, also in a three-dimensional spatial domain.

The ultrasonic anemometer has no rotating components, so that no inertial latency is involved in the system, leading to almost instantaneous and accurate measures. It can optionally be heated to prevent the formation of ice in its structure. It requires almost no maintenance and its working life span is much greater than common rotational anemometers.

However, an ultrasonic anemometer suffers from the shadowing effect of the arms where the transducers are mounted on, especially when the wind stream is parallel to one of the propagation paths, leading to disrupted measures. Its size is more scalable than the mechanical anemometer, but not enough to be integrated with small devices. Finally, its cost can be ten times higher than traditional cup anemometers, so that it is not always within reach of a commercial implementation. Examples of ultrasonic anemometers can be found in [Amman 1994] and [Loucks 2003].

Thermal Anemometer

The thermal anemometer exploits the relationship between the flow velocity and the convective heat transfer from heated elements. The practical implementation consists of a small wire which is electrically heated to a constant temperature or kept at a constant current and exposed to an airflow. The fluid stream cools down the wire and the change of wire temperature/resistance can be mapped to the airflow speed. This relation is non-linear and needs calibration.

This kind of anemometer shows a fine spatial resolution, thanks to its point-wise measurement. However, it is extremely delicate and cannot resolve the wind direction.

Laser Anemometer

The Laser Doppler Anemometer (LDA) is a highly complex, non-intrusive and very directional sensitive instrument. It is used uniquely in fluid dynamics research and it does not require any calibration process. The LDA exploits an optical principle of visible light, i.e., the Doppler shift, which is proportional to the velocity of the fluid particles. It is implemented by a laser source whose beam is split into two parallel beams. A lens focuses the two beams in such a way that they intersect on a region where the fluid is flowing. The fluid particles cause a light scattering, whose Doppler shift in frequency is proportional to the particle's velocity. The flow direction can be resolved by using multiple laser beams with different wavelengths. LDAs are high-tech instruments and therefore have extremely high costs.

The US 2005/131591 describes a system for determining a physical characteristic of an incident flow stream over a surface of a vehicle, like an airplane. The publication of Mirabili and Habets describes a multi-channel wind noise reduction using a Corcos model.

It is an object of the present invention to provide a concept for characterizing an airflow providing a better tradeoff between cost efficiency, integrability and accuracy.

SUMMARY

According to an embodiment, a method for characterizing an airflow may have the steps of: receiving acoustic signals generated by the airflow by means of a microphone array; extracting a characteristic information from the acoustic signals; determining an information on the airflow based on the characteristic information; wherein the information on the airflow has an information regarding a wind speed U and/or a wind direction $\theta_w$; characterized in that the determining of the information is based on the characteristic information extracted from the acoustic signals and an expected version of the respective characteristic information; wherein the expected version is determined using the Corcos model, an ad-hoc model or another model; or in that the step of determining an information is based on a regression or a classification of the characteristic information.

Another embodiment may have a non-transitory digital storage medium having stored thereon a computer program for performing a method for characterizing an airflow having the steps of: receiving acoustic signals generated by the airflow by means of a microphone array; extracting a characteristic information from the acoustic signals; determining an information on the airflow based on the characteristic information; wherein the information on the airflow has an information regarding a wind speed U and/or a wind direction $\theta_w$; characterized in that the determining of the information is based on the characteristic information extracted from the acoustic signals and an expected version of the respective characteristic information; wherein the expected version is determined using the Corcos model, an ad-hoc model or another model; or in that the step of determining an information is based on a regression or a classification of the characteristic information, when said program is run by a computer.

According to another embodiment, an apparatus for characterizing an airflow may have: a microphone array for receiving acoustic signals generated by the airflow; an acoustic signal analysis unit configured to extract a characteristic information from the acoustic signal; and an estimating unit configured to determine an information on the airflow based on the characteristic information; wherein the information on the airflow has an information regarding a wind speed U and/or a wind direction $\theta_w$; characterized in that the determining of the information is based on the characteristic information extracted from the acoustic signals with an expected version of the respective characteristic information; wherein the expected version is determined using the Corcos model, an adhoc model or another model; or in that the step of determining an information is based on a regression or a classification of the characteristic information.

An embodiment provides a method for characterizing an airflow. The method comprises the basic steps of:

- receiving acoustic signals generated by the airflow by means of a microphone array (two or more acoustic signals from two or more microphones and/or belonging to two or more points of time);
- extracting a characteristic information (e.g. temporal and/or spectral and/or spatial information and/or a feature)

from the acoustic signals (from an audio signal representing the received/recorded acoustic signal); and determining an information on the airflow based on the characteristic information.

Embodiments of the present invention are based on the principle that a joint estimation of an airflow speed and airflow direction is achieved by means of an analysis of received acoustic signals generated by the turbulent motion of the airflow over a microphone array. According to α(advantageous) variant, the microphone array comprises a plurality of microphones (e.g., 3 microphones which are closely spaced). According to this approach, the spatial properties of recorded wind noise are exploited that are dependent on the wind stream speed and direction.

Another embodiment provides an apparatus for characterizing an airflow. The apparatus comprises a microphone array, an acoustic signal analysis unit and an estimation unit. The microphone array is configured to receive acoustic signals generated by the airflow. The acoustic signal analysis unit is configured to extract characteristic information. The estimation unit is configured to determine information on the airflow (e.g., the wind speed and/or direction) based on the characteristic information. This embodiment can be implemented as a low-cost and small-sized system where no moving parts are involved. In particular, it can be integrated in existing multi-microphone systems, e.g., smart phones and action cameras, which typically comprise a microphone array comprising a plurality of microphones (e.g., having sufficiently small microphone distance). According to an embodiment, the information on the airflow comprises an information regarding a wind speed U and/or a wind direction $\theta_w$.

Below, two different examples for a determination are given.

According to a first embodiment, the step of determining is based on a correlation of the characteristic (temporal, spectral and/or spatial) information extracted from the acoustic signal (by use of the extracting step) within a respective version of the characteristic information. According to embodiments, the respective version may be determined using a so-called Corcos model. This model may be described by the following formula $$\gamma_{12}(k, U, \theta_w) = \exp\left(\frac{-\alpha(\theta_w)\omega_k d}{U_c}\right)\exp\left(\frac{j\omega_k d\cos(\theta_w)}{U_c}\right)$$

Alternatively, other models, like an ad-hoc or empirical model may be used.

When starting from the Corcos model, the step of determining may comprise the sub-step of computing an optimal set (U, $\theta_w$) by solving the least-square (LS) minimization.

$$[\hat{U}, \hat{\theta}_w] = \underset{[U,\theta_w]}{\operatorname{argmin}} \sum_{k\in K} \left|\hat{\gamma}_{12}(k) - \gamma_{12}(k, U, \theta_w)\right|^2.$$

According to a second embodiment, the step of determining may be based on a regression or classification of a feature as characteristic information. Here, this feature may be compared with α(previously) extracted feature (determined using a training data set for teaching the algorithm). According to an embodiment, the feature may be extracted from the acoustic signals (audio signals representing the received/recorded acoustic signals) by use of a supervised machine learning approach, a deep learning approach, e.g., by means of a convolutional or fully-connected neural network. Here, the determining of the information on the airflow may—according to embodiments—performed by mapping the obtained features to measures of an characterized airflow.

According to further embodiments, the above-described approach/method may comprise the step of isolating wind noise out of the received acoustic signal. This may, for example, be done by using low pass filtering. Here, a frequency range of the acoustic signal is selected/filtered. The selected frequency range lies within 20 Hz to 20 kHz. For example, a frequency range below 1.5 kHz or 2 kHz may be selected. The frequency range to be selected may—according to further embodiments—be estimated using another step. This means that the method comprises the steps of dedicating and estimating/extracting wind noise from the other acoustic signals. According to a further embodiment, the isolating may be performed by use of transforming the acoustic signal into the time-frequency domain or another domain. Thus, according to this alternative a preprocessing and transforming of the microphone signals into the time-frequency domain or another suitable domain is performed.

According to further embodiments, the method may further comprise a post processing to remove outliers. The post processing has the purpose to remove possible outliers out of the obtained measures of speed and direction. Furthermore, an averaging over the time may be performed.

According to embodiments, the microphone array may comprise at least three microphones. Advantageously, the microphones are arranged quite close to each other. This means according to embodiments, that the microphones of the microphone array may be spaced apart from each other by a distance less than 30 mm, less than 20 mm, less than 50 mm or less than 10 mm. According to further embodiments, the microphones of the microphone array are arranged in a planar constellation and/or may be mounted in the so-called free field.

All the discussed aspects may be implemented within the above defined method as well as implemented within the above-described apparatus. Furthermore, it should be noted, that some method steps may be software implemented. Therefore, another embodiment refers to a computer program for performing one or all of the above-described method steps.

BRIEF DESCRIPTION OF THE DRAWINGS

Embodiments of the present invention will be subsequently discussed referring to the enclosed drawings, in which:

FIG. 9 shows a table illustrating wind speed and direction estimated with the embodiment, compared to the wind speed and direction measured by the ultrasonic anemometer ATMOS 22.

DETAILED DESCRIPTION OF THE INVENTION

Figure 1A:
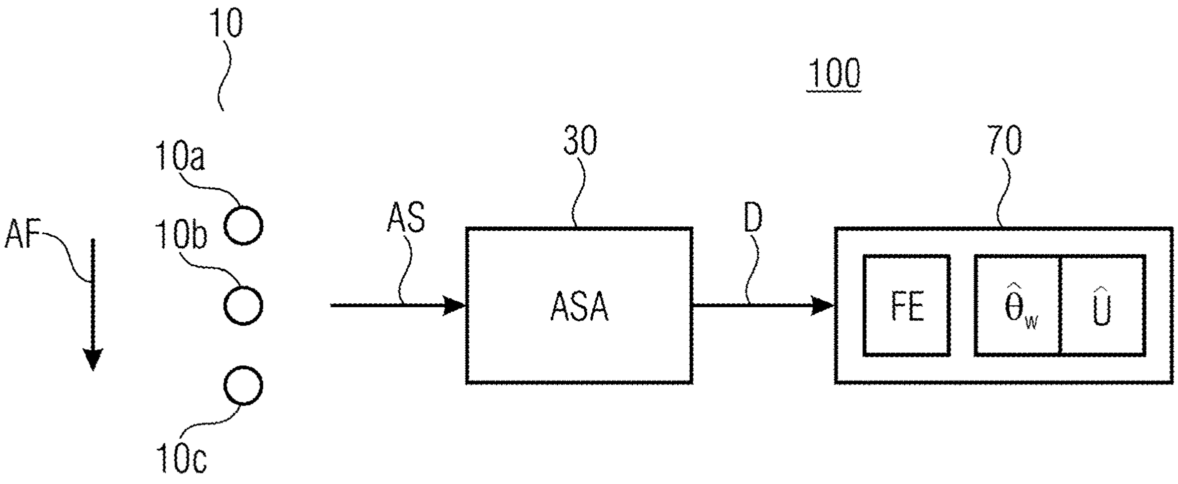
FIG. 1*a* shows a schematic block diagram of acoustic anemometer according to a basic embodiment.

Below, embodiments of the present invention will be subsequently discussed referring to the enclosed figures, wherein identical reference numbers are provided to objects/structures having identical or similar function, so that the description thereof is mutually applicable or interchangeable.

FIG. 1 a shows an apparatus for characterizing an airflow AF and especially for determining parameters, like the wind speed U or the direction $\theta_w$ describing the airflow AF. The apparatus which is marked by the reference numeral 100 comprises a microphone array 10, e.g., having three microphones 10*a* to 10*c*. According to embodiments, the microphone array 10 is a planar or 3D microphone array.

The apparatus 100 comprises an analyzing unit 30 (ASA) which receives the acoustic signal AS from the microphone array 10. Same performs a processing and outputs data comprising a characteristic information for the received acoustic signal AS, like a temporal information and/or spectral information and/or spatial information for or a feature of the acoustic signal AS. These data are marked by the reference numeral D.

The subsequent unit 70, which is referred to as estimator/determiner, receives the characteristic information D for determining an information on the airflow, e.g., the airspeed U or the direction $\theta_w$.

Since now the structure has been described, the functionality of same will be discussed.

To resolve the wind (or a generated airflow speed and direction of the airflow AF), the acoustic vane anemometer 100 is used. It should be noted that the term "acoustic" does not relate to ultrasonic sensors but merely on recoded acoustic signals.

To measure the wind speed U and the direction $\theta_w$, embodiments of the present invention relies uniquely on the processing of the received acoustic signals AS at the microphones 10*a* to 10*c*. For this, the microphone array 10 having at least three microphones performs the step of receiving the acoustic signal AS. In contrast to the prior art, this concept does not involve a transmitter, as the signal processing is performed in the audible range 20 Hz to 20 kHz rather than in ultrasonic range.

The received signals AS are processed to extract temporal and/or spectral and/or spatial information by the unit ASA 30. Based on this information, the wind speed U and the direction $\theta_w$ can be resolved. This step is performed by the unit 70.

A plurality of evaluation/estimation concepts are possible. According to a first aspect, a so-called model-based estimation of wind speed and direction is used. Here, an analysis of the spatial characteristics of the wind noise (cf. signal AS) is performed (cf. unit 30) and a correlation of the respective values with expected values, e.g., generated by use of a model is determined. The model may be the Corcos model or another ad-hoc model describing wind noise dependent on a wind direction $\theta_w$ or wind speed U. This input parameter for the model can be determined reversely so that it is possible to determine or estimate the wind speed U and/or the direction $\theta_w$ starting from the determined correlation of the received values (cf. reference numeral v) and the expected values. Expressed in other words, this means that the entity 70 performs computing the spatial covariance of turbulent-like noise induced by the airflow AF to obtain the speed and/or direction of the airflow AF by means of minimization of the distance between the measured spatial covariance and the Corcos model or a different model.

According to another approach, the wind speed and direction may be estimated based on a feature-based approach. Here, a regression or a classification of microphone signals and especially of an extracted feature is performed. The results of this classification are determined by characteristic features. These features can be compared/mapped with previously determined features. Here, the previously determined features are claimed with labeled data.

When coming back to the processing, performed by the entity 100, it should be noted that the acoustic signal analysis or the employing of a convolutional neural network for extracting the features is performed by the ASA 30, wherein the final classification approach/mapping is then done by the entity 70 in order to determine the wind speed U or direction θ. Expressed in other words, this means that hand-crafted features or features extracted by means of the convolutional neural network (CNN) are used to perform a regression/classification. This regression/classification may be performed by use of supervised machine learning or deep learning in order to map the obtained features to measures of the airflow speed and/or direction.

From the hardware point of view the acoustic vane anemometer 100 consists of a processor 30+70 and three or more microphones 10*a*-10*c* with a relatively small inter-sensor distance (less than 2 cm) and membrane, arranged in a planar constellation. The microphones may be mounted in the free field, in order to minimize complex turbulence caused by the solid geometry of the electronic board or the casing. No moving parts are involved.

Below, an enhanced embodiment will be discussed with respect to FIG. 1*b*.

Figure 1B:
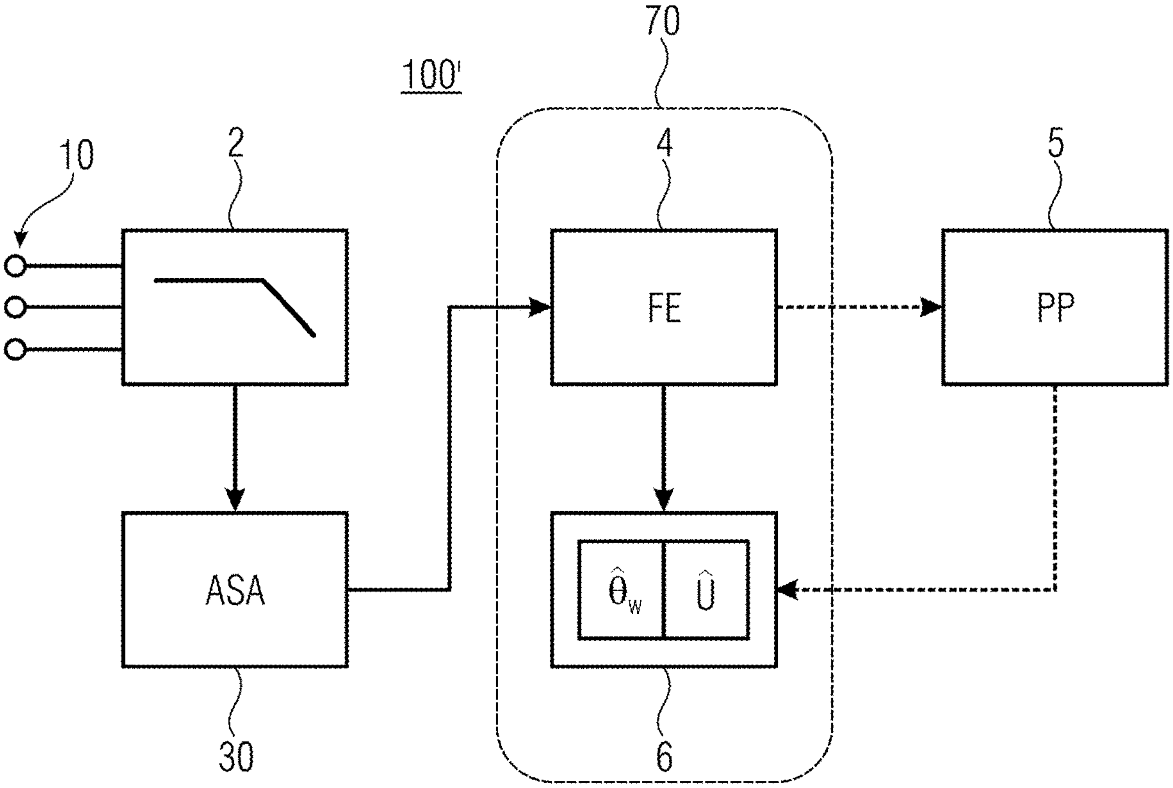
FIG. 1*b* shows another schematic block diagram of an acoustic anemometer according to an enhanced embodiment.

FIG. 1*b* illustrates a block scheme of an enhanced embodiment for an acoustic vane anemometer 100'. Here, the acoustic signals AS are measured by a microphone array with closely spaced aperture 10 and sampled at a defined sampling frequency. A pre-processing block 2 transforms the received signals into the time/frequency domain or another suitable domain in which the wind noise is at least partially isolated from other acoustic sources. Alternatively, a low-pass filtering can be applied to limit the bandwidth of the received signal up to a specific value, e.g., 1.5 kHz, where most of wind noise energy is present (Nelke 2014). In this case of different acoustic sources overlapping in frequency with wind noise, it is possible to implement an estimation algorithm aiming towards the extraction of wind noise. For instance, using the expectation minimization (EM) algorithm described in (Schwartz 2018).

Once the wind noise has been isolated, an acoustic signal analysis (ASA) is performed in block 30. The analysis focuses on temporal, spectral and spatial information of recorded wind noise. Subsequently, in block 4 relevant quantities that are proportional or can be mapped to the wind speed and direction are computed based on previous analysis (i.e., feature extraction, FE). The relation between the obtained quantities and the wind speed and direction can be obtained, for example, based on a model-based estimation (cf. embodiment model based estimation), or obtained using supervised machine or deep learning techniques (cf. embodiment feature-based estimation). Based on the above relation, instantaneous estimates of wind speed and direction are obtained in block 6. In FIG. 1*a*, the dashed lines depict an optional post-processing (PP) step: in block 5, it is possible to remove the measures detected as outliers, e.g., with a median filter, and average the measures over time with a desired resolution as well as extracted the maximum values of speed, typically named wind gusts.

Figure 2:
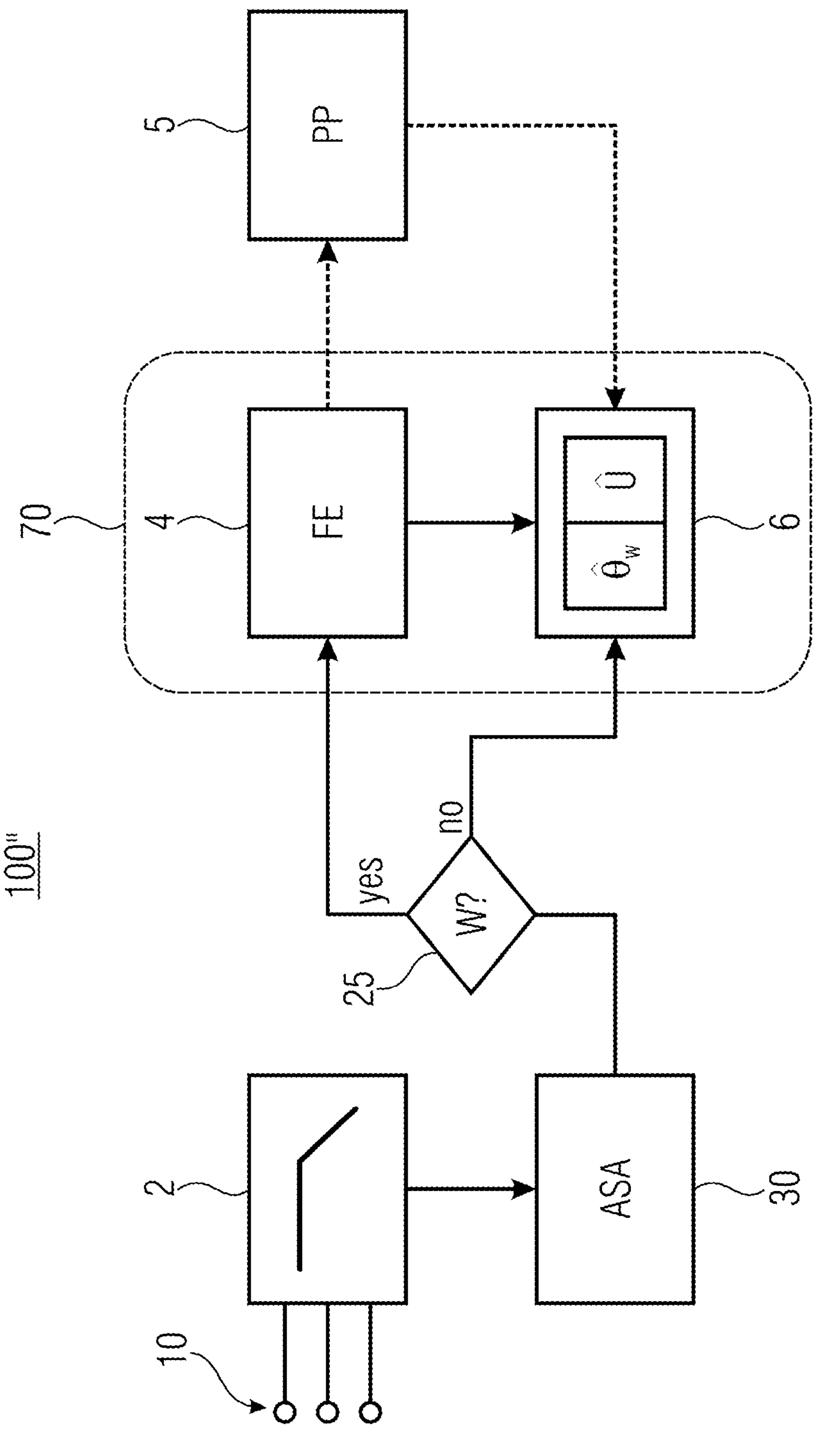
FIG. 2 shows a schematic block diagram of an acoustic anemometer with wind-presence decision step according to further embodiments.

FIG. 2 shows an acoustic anemometer 100" having an additional decision step W? (cf. entity 25). Block 25 is added to the block scheme 100' of FIG. 1*a*, wherein the entity 25 is configured to detect the presence or the absence of wind noise. This can be achieved based on the acoustic signals analysis. If the condition of absence of wind occurs, the system can give $\hat{U}$ and $\hat{\theta}_w$ as null output values.

Embodiment Model-Based Estimation of Wind Speed and Direction

The embodiment provides an estimate of U and/or $\theta_w$ based on the analysis of the spatial characteristics of wind noise, when recorded with a closely-spaced microphone array. The spatial coherence is a complex normalized quantity that describes the correlation, i.e., the similarity of two signals in the frequency domain, defined as $$\gamma_{12}(l,k) = \frac{E\{Y_1(l,k)\cdot Y_2^*(l,k)\}}{\sqrt{E\{Y_1(l,k)\cdot Y_1^*(l,k)\}\cdot E\{Y_2(l,k)\cdot Y_2^*(l,k)\}}} \tag{1}$$

where $Y_1$(l, k) and $Y_2$(l, k) refer to the first and second microphone signal, with l and k denoting the time frame and frequency bin indices respectively, E{·} denotes the expected value and .*denotes the complex conjugate. In the field of speech enhancement and noise reduction (e.g., in digital hearing aids), wind noise is typically assumed uncorrelated, i.e., with a zero-valued coherence. However, as shown in [Mirabilii2018], the spatial coherence of wind noise signals can be approximated by a fluid dynamics model, namely the Corcos model [Corcos1964], when the microphone distance is sufficiently small. The Corcos model is defined as $$\gamma_{12}(k,U,\theta_w) = \exp\left(\frac{-\alpha(\theta_w)\omega_k d}{U_c}\right)\exp\left(\frac{j\omega_k d\cos(\theta_w)}{U_c}\right) \tag{2}$$

where $\omega_k=2\pi kF_s/K$ denotes the discrete angular frequency, K and $F_s$ denote the length of the discrete Fourier transform and the sampling frequency respectively, d denotes the microphone distance, $U_c$ denotes the convective turbulence speed (approximately 80% of the free field wind stream U), $\alpha(\theta_w)$ denotes a coherence decay parameter that depends on the wind direction, defined by $$\alpha(\theta_w)=\alpha_1|\cos(\theta_w)|+\alpha_2|\sin(\theta_w)| \tag{3}$$

where $\alpha_1$ and $\alpha_2$ denote the longitudinal and lateral coherence decay rates respectively, empirically determined in [Mellen1990]. The wind direction $\theta_w$ is defined with respect to the microphone axis, so that 0° and 90° correspond to a wind flow parallel and orthogonal to the microphone axis, respectively. In FIG. 3, the real and imaginary part of the spatial coherence of different wind noise measurements is shown in solid lines, compared to the Corcos model in dashed lines.

Since the Corcos model depends on the wind speed and direction, the abovementioned parameters are estimated from microphone-pair signals computing the optimal set [$\hat{U}$, $\hat{\theta}_w$] by solving the least-squares (LS) minimization problem $$[\hat{U},\hat{\theta}_w] = \underset{[U,\theta_w]}{\operatorname{argmin}} \sum_{k\in K}\left|\tilde{\gamma}_{12}(k)-\gamma_{12}(k,U,\theta_w)\right|^2 \tag{4}$$

where the time frame l was omitted for brevity, $\tilde{\gamma}_{12}(k)$ denotes the measured spatial coherence computed as in (1), $\gamma_{12}$(k, U, $\theta_w$) denotes the theoretical model which depends on the wind speed and direction (where $U_c=0.8\cdot U$), and K is the set containing the considered frequency (advantageously a low frequency range). The mathematical expectations in (1) can for example be recursively estimated, by defining $$E\{Y_i(l,k)\cdot Y_j^*(l,k)\} = \Phi_{ij}(l,k) \text{ and computing}$$

$$\Phi_{ij}(l,k) = \beta\cdot\Phi_{ij}(l-1,k) + (1-\beta)\cdot Y_i(l,k)\cdot Y_j^*(l,k),$$

with $\beta \in [0,1)$. By using two microphones or more generally a linear array, an ambiguity in the estimation of the wind direction occurs. A linear array presents a field of view (FOV) restricted to $\theta_w \in [0°, 180°]$, so that it is incapable to distinguish between directions that are symmetric with respect to the microphone axis. For instance, $\gamma_{12}$(k, U, $\theta_w$) has the same expression for a wind direction of 150° or 210°, given the same wind speed. The choice of a 2-D array, i.e., at least 3 microphones in a two-dimensional distribution over a plane is therefore of advantage to uniquely identify the true wind direction $\theta_w \in [0°, 360°]$.

Therefore, it is possible to define an expression of the Corcos model for an arbitrary planar geometry with N microphones. The model is expressed in terms of fixed cartesian coordinates (x,y), e.g., positive direction of the y-axis oriented towards the true North, positive direction of the x-axis oriented towards the true East. The wind stream propagation is defined by the vector $\vec{u}=Q\cdot\bar{u}$ where $Q=1/U_c$ and $\bar{u}$ is the unit vector pointing towards the direction from where the wind is flowing. Therefore, the norm of the wave vector is defined as $\|\vec{u}\|=|Q|$. The position vector of the i-th microphone is denoted by $\vec{r}_i$, so that $\vec{r}_{ij}=\vec{r}_j-\vec{r}_i$ and $\|\vec{r}_{ij}\|=d_{ij}$ is the distance between the i-th and the j-th microphone.

The model can be rewritten as $$\gamma(k,\vec{u},\vec{r}_{ij})=\exp(-\alpha(\vec{u},\vec{r}_{ij})\omega_k+j\omega_k\vec{u}\cdot\vec{r}_{ij}) \tag{5}$$

where the decay rate is now defined by $$\alpha(\vec{u},\vec{r}_{ij})=\alpha_1|\vec{u}\cdot\vec{r}_{ij}|+\alpha_2|\vec{u}_\perp\cdot\vec{r}_{ij}| \tag{6}$$

where $\vec{u}_\perp$ denotes the vector orthogonal to the vector $\vec{u}$. Since the lateral decay is given by the absolute value of the orthogonal component of $\vec{r}_{ij}$ onto $\vec{u}_\perp$, the orientation of $\vec{u}_\perp$ is arbitrary (±90° w.r.t. $\vec{u}$). It can be noticed how the model in (2) is analogous to the model in (5) since $$\vec{u}\cdot\vec{r}_{ij} = \|\vec{u}\|\cdot\|\vec{r}_{ij}\|\cdot\cos(\theta_w) = \frac{1}{U_c}\cdot d_{ij}\cos(\theta_w)$$

and $$\vec{u}_\perp\cdot\vec{r}_{ij} = \|\vec{u}_\perp\|\cdot\|\vec{r}_{ij}\|\cdot\cos\left(\frac{\pi}{2}-\theta_w\right) = \frac{1}{U_c}\cdot d_{ij}\sin(\theta_w).$$

Figure 4:
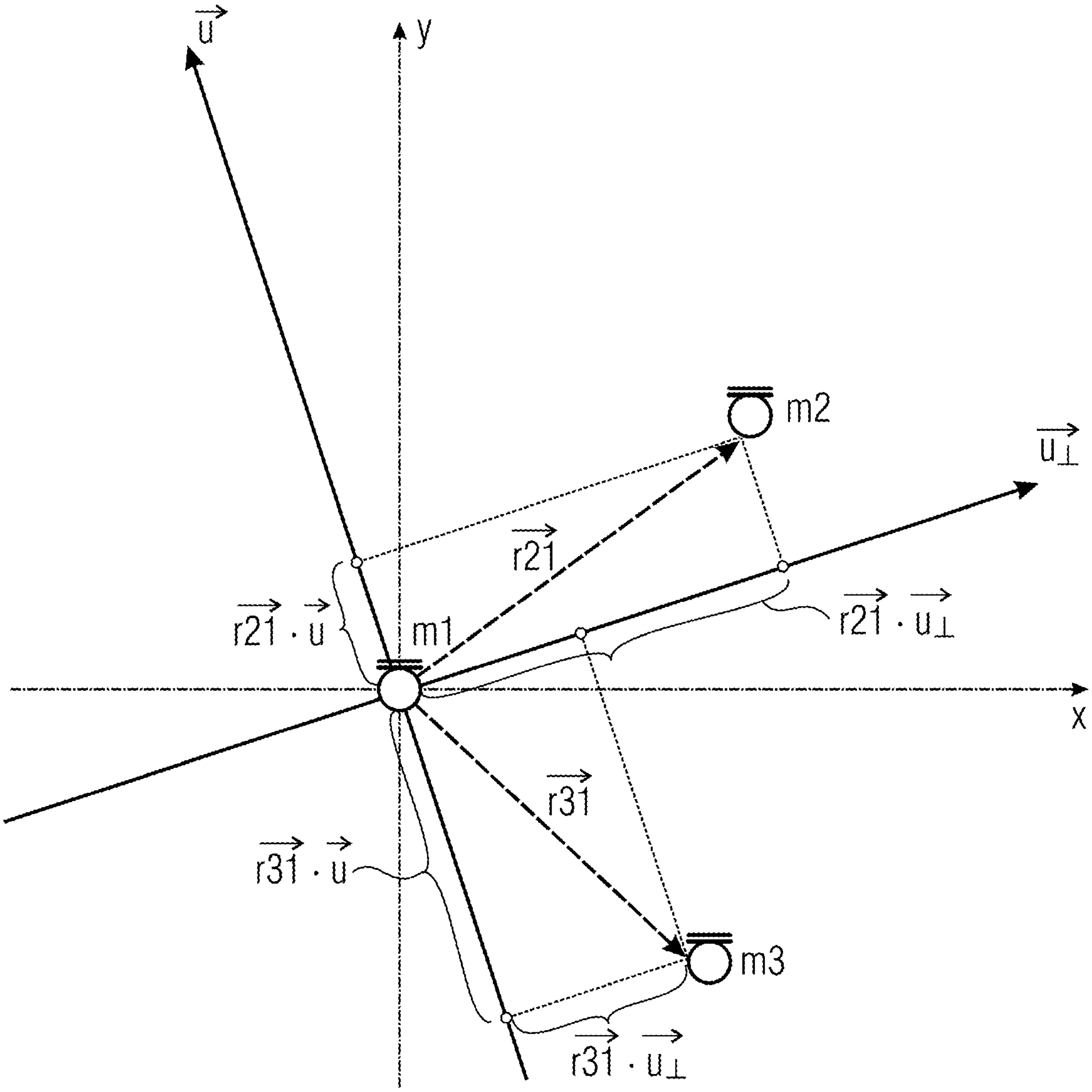
FIG. 4 shows a schematic vector representation of the reference system for illustrating the Corcos model.

FIG. 4 shows the abovementioned reference system where the position vector $\vec{r}_{32}$ was omitted for clarity. Given (5), it is possible to arrange the spatial coherence of each microphone pair in a matrix form, i.e., the spatial coherence matrix. Rewriting $\gamma(k, \vec{u}, \vec{r}_{ij})=\gamma_{ij}(k,\vec{u})$, the spatial coherence matrix is defined by $$\Gamma(k,\vec{u}) = \begin{bmatrix} \gamma_{11}(k,\vec{u}) & \gamma_{12}(k,\vec{u}) & \dots & \gamma_{1N}(k,\vec{u}) \\ \gamma_{21}(k,\vec{u}) & \gamma_{22}(k,\vec{u}) & \dots & \gamma_{2N}(k,\vec{u}) \\ \vdots & \vdots & \ddots & \vdots \\ \gamma_{N1}(k,\vec{u}) & \gamma_{N2}(k,\vec{u}) & \dots & \gamma_{NN}(k,\vec{u}) \end{bmatrix} \tag{7}$$

where $\gamma_{ji}(k, \vec{u})=\gamma^*_{ij}(k, \vec{u})$.

To resolve the wind speed and direction using an arbitrary array geometry, the Frobenius norm of a composite error matrix given by the difference between the measured spatial coherence matrix and the matrix defined by the Corcos model is minimized. The method can be written as $$\hat{u} = \underset{u}{\operatorname{argmin}} \sum_{k\in K} \|\Gamma_e(k,\vec{u})\|_F^2 \tag{8}$$

where û is the estimated wind propagation vector, $$\|\cdot\|_F^2$$

is the squared Frobenius norm of a matrix and $\Gamma_e(k, \vec{u})$ is defined as $$\Gamma_e(k,\vec{u})=\tilde{\Gamma}(k)-\Gamma(k,\vec{u}) \tag{9}$$

where $\tilde{\Gamma}(k)$ is the measured spatial coherence matrix computed from the microphone observations, defined by $$\tilde{\Gamma}(k) = \begin{bmatrix} \tilde{\gamma}_{11}(k) & \tilde{\gamma}_{12}(k) & \dots & \tilde{\gamma}_{1N}(k) \\ \tilde{\gamma}_{21}(k) & \tilde{\gamma}_{22}(k) & \dots & \tilde{\gamma}_{2N}(k) \\ \vdots & \vdots & \ddots & \vdots \\ \tilde{\gamma}_{N1}(k) & \tilde{\gamma}_{N2}(k) & \dots & \tilde{\gamma}_{NN}(k) \end{bmatrix} \tag{10}$$

where $\tilde{\gamma}_{ij}(k)$ is computed as in (1), and $\Gamma(k, \vec{u})$ is the spatial coherence matrix in (5). This way, the entire set of microphones is employed avoiding direction ambiguities, since û is univoquely determined among all the microphone pairs and hence extending the field of view ∈ [0,360°].

This embodiment is not necessarily restricted in modelling the turbulent flow with the Corcos model. In fact, the statistical pressure spatial-correlation function of turbulence can be modelled with different approximations, like in [Chase1980], [Williams1982], [Smol'yakov1991], or [Caiazzo2016]. Moreover, it is possible to formulate an ad-hoc model based on a calibration process in a controlled environment, e.g., a wind tunnel. Results from practical applications of this embodiment are shown in Section 5.

Embodiment Feature-Based Estimation of Wind Speed and Direction

This embodiment provides an estimate of the wind speed and direction based on a regression or a classification approach. Starting from the multi-channel microphone signals, relevant features are extracted by means of an acoustic signal analysis (hand-crafted features) or employing a CNN.

Subsequently, it is possible to address a regression or a classification process to map the extracted features to defined values of wind speed and direction, using supervised machine learning (e.g., linear/nonlinear regression or support vector machines) or deep learning (e.g., a neural network) techniques. In case of a classification approach, the wind direction is treated as a categorical variable (e.g., N, E, S, W, NE, SE, SW, NW etc.) associated to 4, 8 or 16 nominal categories given by the cardinal directions, while the wind speed can be discretized in multiple sub-ranges with a defined resolution (e.g. [0-5] km/h, [5-10] km/h, etc.).

The training is supervised with a labelled data set, provided by simulated and measured wind noise signals. Simulated data can be obtained employing the artificial generation approach proposed in [Mirabilii2018]. Measured data can be obtained recording wind noise and subsequently synchronizing the audio signals with simultaneous measurements of wind speed and direction, using a mechanical or ultrasonic anemometer.

Figure 3A:
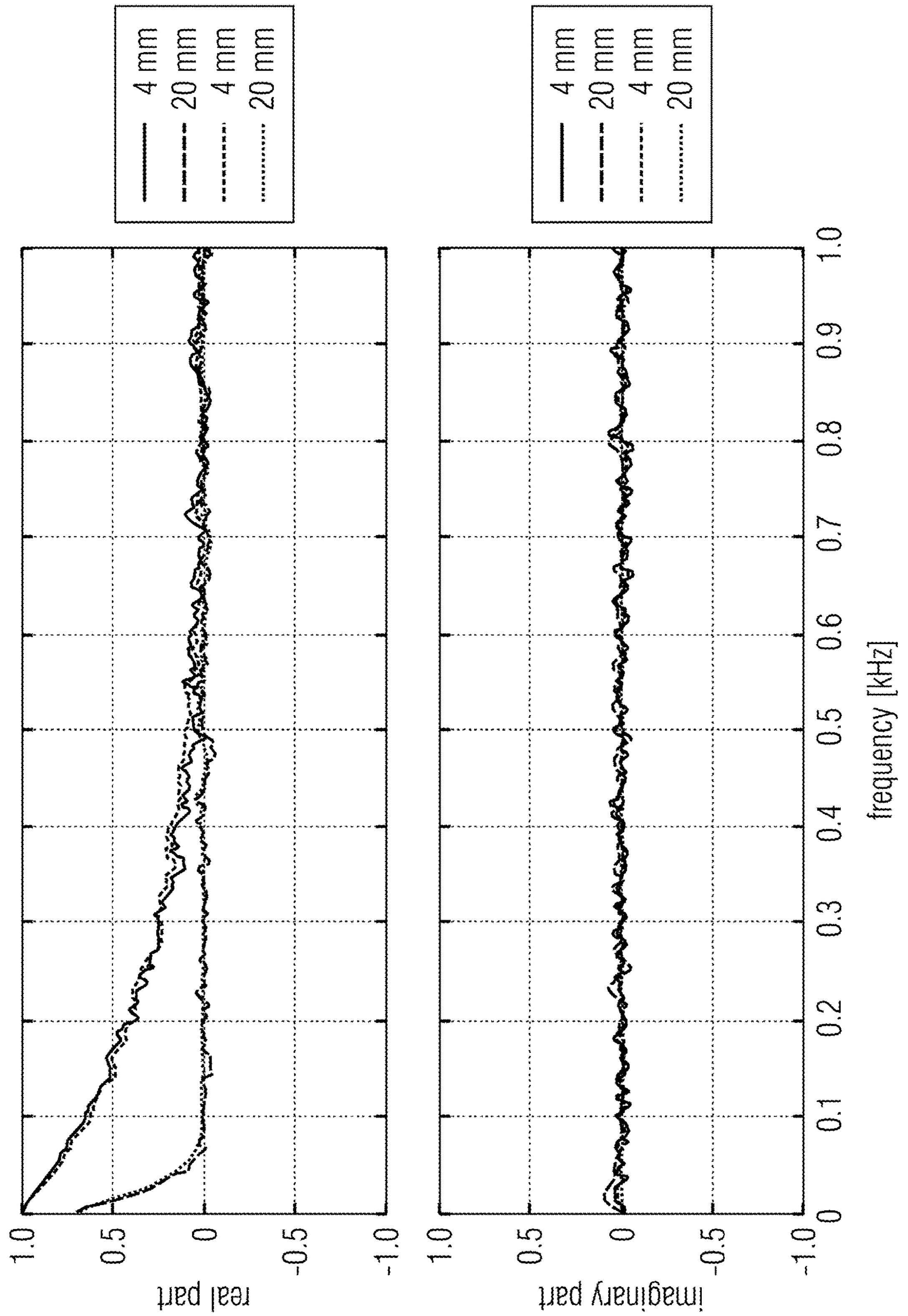
FIG. 3*a* shows schematic diagrams for illustrating the spatial covariance of wind noise compared to the Corcos model according to an embodiment.
Figure 3B:
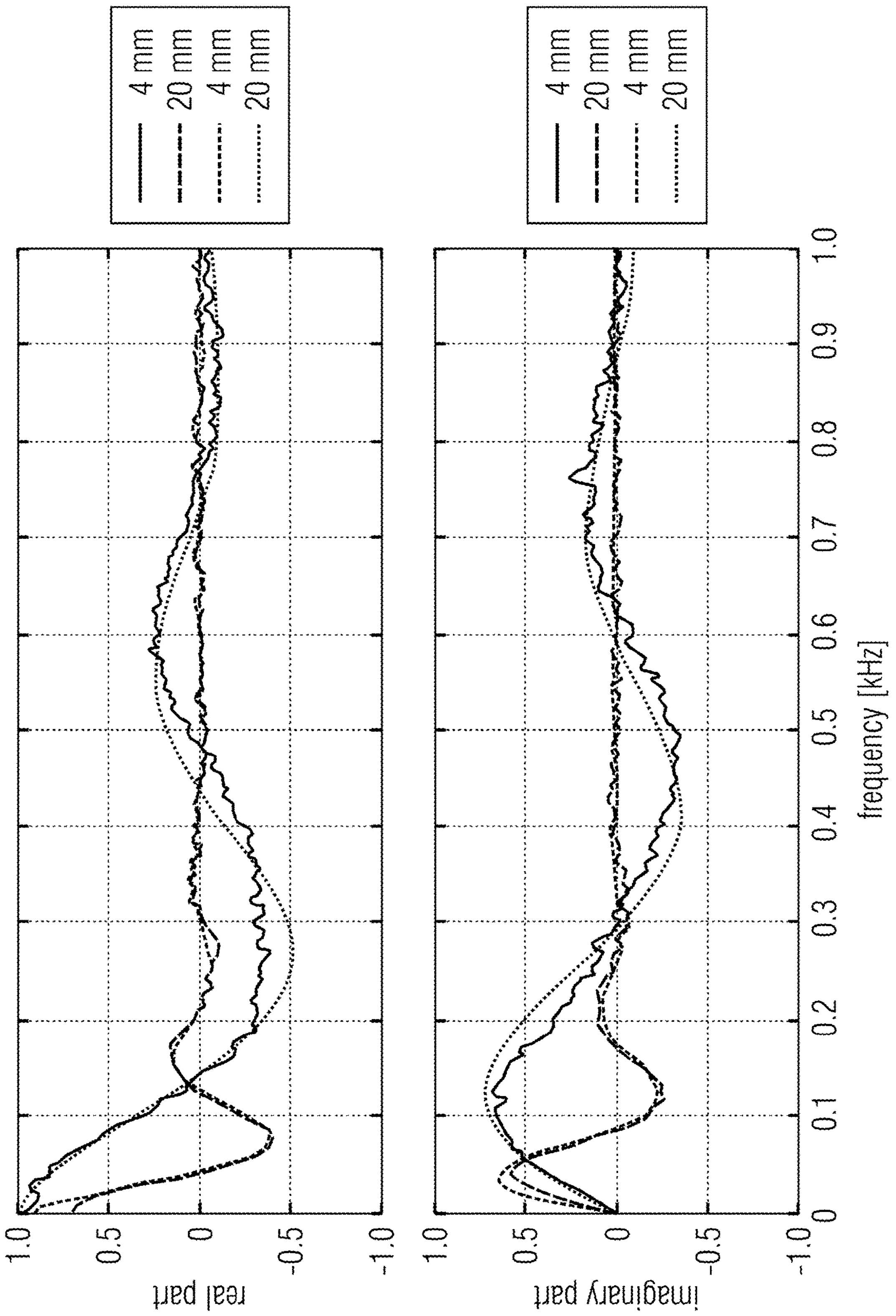
FIG. 3*b* shows schematic diagrams for illustrating the spatial covariance of wind noise compared to the Corcos model according to an embodiment.

With respect to FIGS. 5, 6, 7 and 8, practical examples for the above-described approach will be given. FIG. 3 illustrates real and imaginary part of the spatial coherence of wind noise recorded with closely-spaced microphones (solid lines) compared to the Corcos model (dashed line). Here, FIG. 3*a* shows airflow at 90° and 1.8 m/s (microphone distance 4 mm and 20 mm. FIG. 3*b* shows the airflow at 0° and 2.8 m/s (microphone distance 4 mm and 20 mm).

FIG. 4 illustrates a reference system of the Corcos model expression in formula (5). Here, m1, m2 and m3 denote the microphones position, ii denotes the wind flow propagation vector, E1 denotes the vector orthogonal to the propagation vector and r21, r31 denote the microphone axis vectors.

Figure 5:
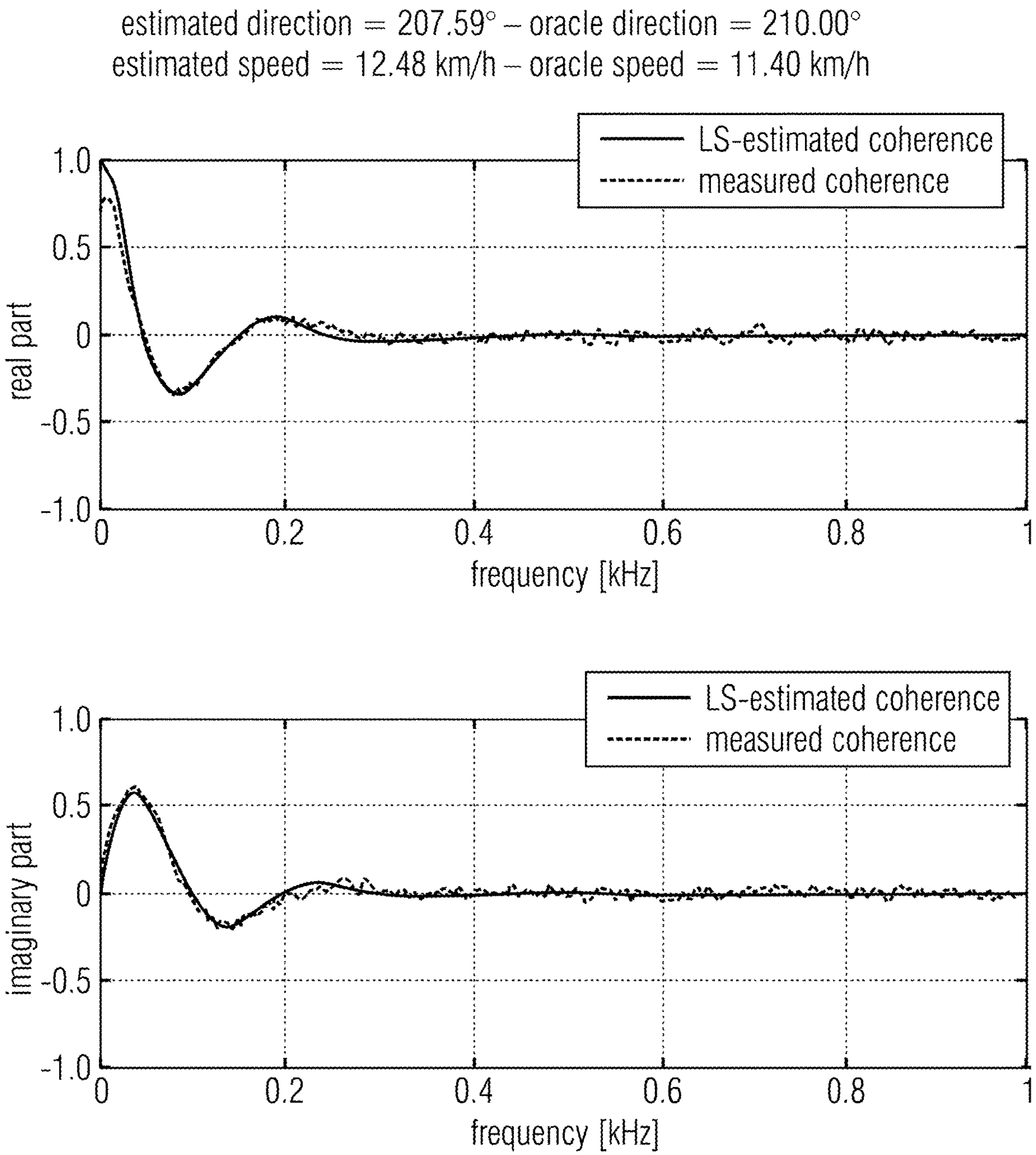
FIGS. 5-8 show schematic diagrams for illustrating the spatial covariance of wind noise compared to the Corcos model according to an embodiment.
Figure 6:
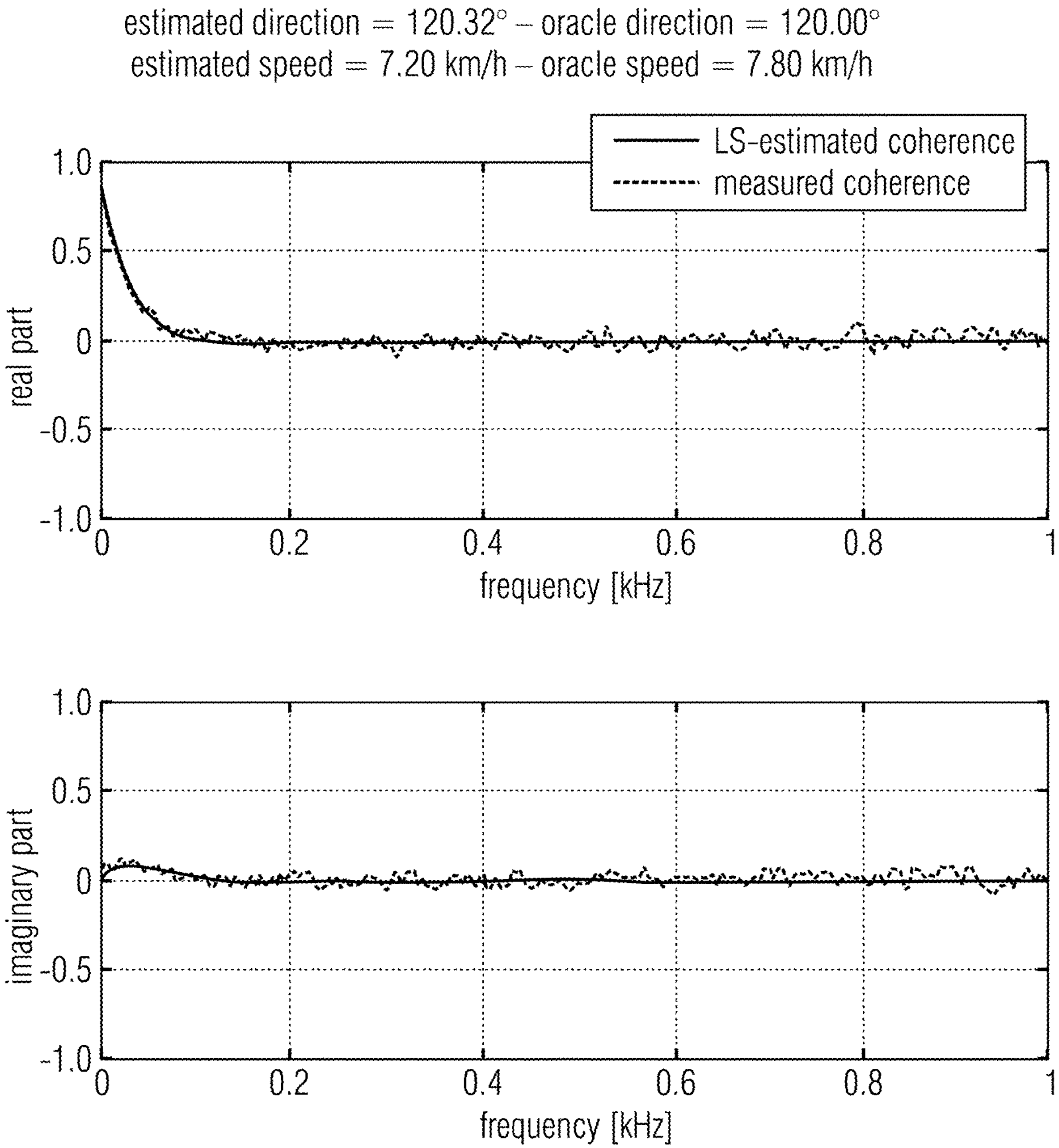

FIG. 5 illustrates real and imaginary part of the spatial coherence measured from 30 seconds of indoor noise recordings, compared to the best fitting Corcos model. FIG. 6 illustrates real and imaginary part of the spatial coherence measured from 30 seconds of indoor noise recordings, compared to the best fitting Corcos.

Figure 7:
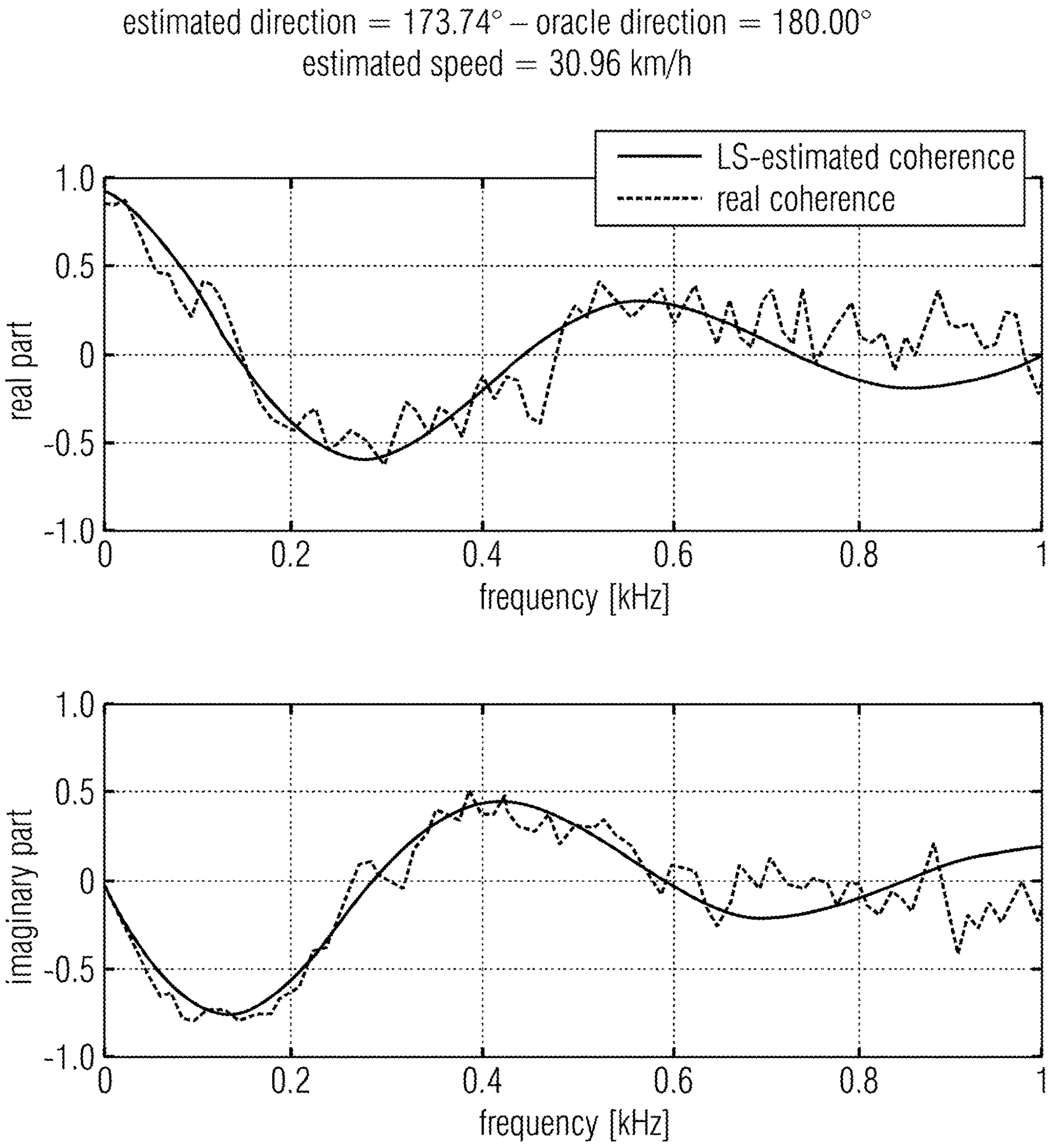
Figure 8:
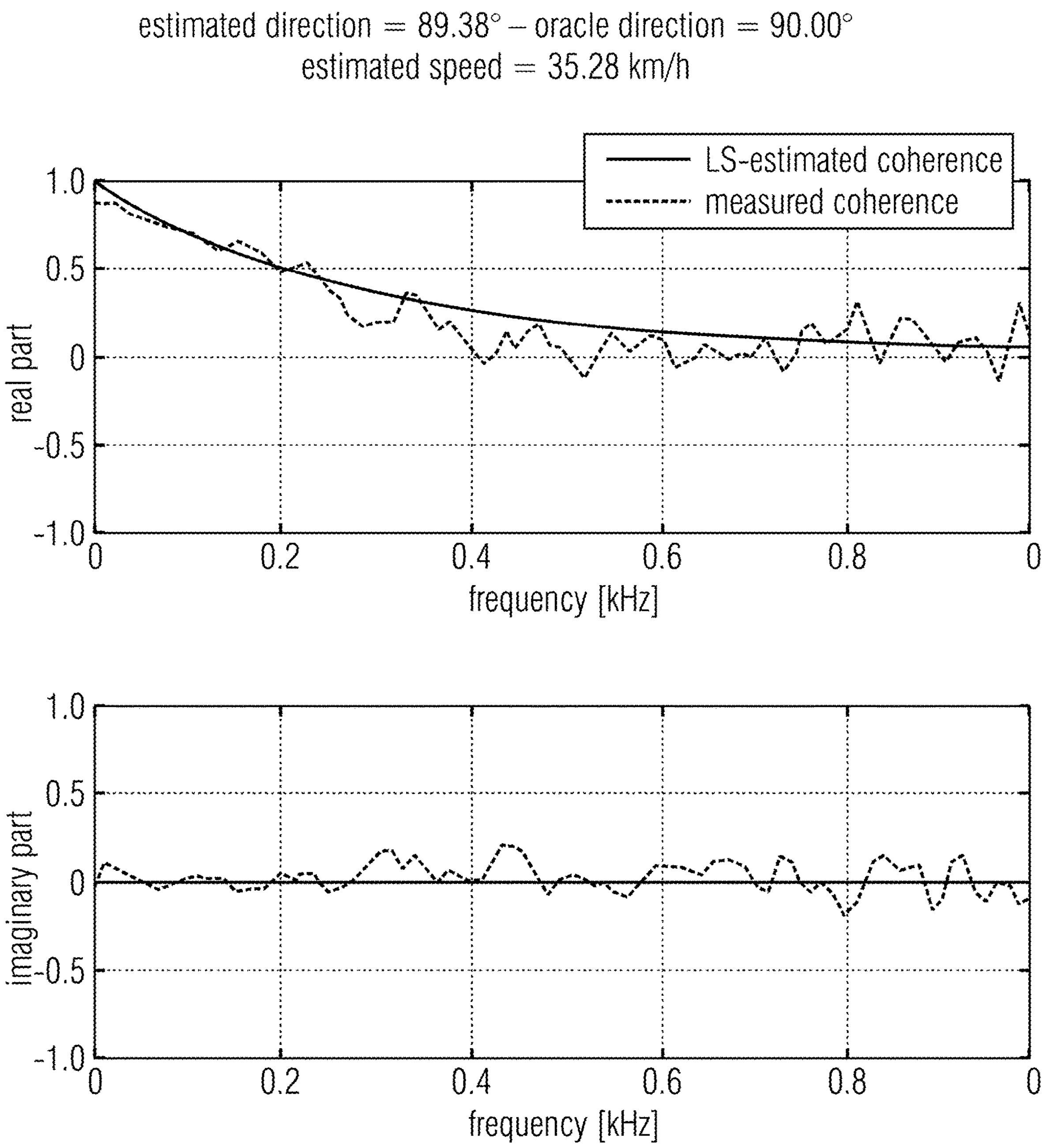

FIG. 7 shows real and imaginary part of the spatial coherence measured from 1 second of outdoor noise recordings, compared to the best fitting Corcos model. FIG. 8 shows real and imaginary part of the spatial coherence measured from 1 second of outdoor noise recordings, compared to the best fitting Corcos model.

This section provides some examples of the embodiment applied to indoor and outdoor measurements of wind noise. In FIG. 5 and FIG. 6, results from an indoor experiment are shown. A circular microphone array of 4 closely-spaced MEMS microphones was exposed to an airflow generated by a stationary fan, in a low-reverberant room. The radius of the circular array was approximately 1 cm. Controlling the fan power and position it was possible to vary both speed and direction of the airflow. The speed of the air stream was measured by a handheld anemometer. The air stream direction was manually labelled using a protractor. The direction of the airflow was oriented consistently with the axis of the first microphone pair, assuming a laminar flow and a plane wave propagation.

In FIGS. 5 and 6, the spatial coherence of the recorded turbulent noise induced by the air stream is shown in red solid lines. The spatial coherence was averaged over 30 seconds of noise recordings. The spatial coherence estimated using the approach of the Embodiment 1 are shown in blue solid lines. In FIG. 5, the measured spatial coherence of an air stream with an approximately constant speed and direction of 11.4 km/h and 210° is compared to the estimated spatial coherence, with the resulting estimated speed and direction shown above. Likewise, FIG. 6 shows the estimated speed and direction for an airflow with an approximately constant speed and direction of 7.8 km/h and 120°.

Outdoor measurements were recorded with a circular microphone array of 3 closely-spaced MEMS microphones. The radius of the array was 0.7 cm. The wind direction was manually labelled with respect to the axis of the first microphone pair, while wind speed measures were unavailable. Due to high variations in speed and direction, the measured spatial coherence was averaged over only 1 second of recordings.

FIGS. 7 and 8 show the measured spatial coherence and the LS-estimated spatial coherence of wind noise recorded in the Negev desert and in the Jerusalem beach in Tel Aviv, respectively.

An additional experiment was held that compared the measures obtained using the embodiment to the readings of the ultrasonic anemometer ATMOS 22 (https://www.meter-group/com/environment/products/atmos-22-sonic-anemometer/). The anemometer measures were synchronized with the audio recordings. The microphone array was the same of the experiment described in FIGS. 4 and 5. The anemometer and the microphone array were aligned and exposed to a stationary fan at different positions, resulting in different airflow velocities and directions. The embodiment was used to resolve the airflow speed and direction. Table 1/FIG. 9 shows the comparisons between the measures of the ultrasonic anemometer as "True speed" and "True direction" (provided by the ultrasonic anemometer) and the estimates obtained using the embodiment as "Estimated speed" and "Estimated direction", averaged over a time interval of 3 seconds.

Table 1 shows how the embodiment can provide estimates close to those obtained by an ultrasonic anemometer. Additional results of both indoor and outdoor recordings exhibited estimates and tracking speed that are in line with the requirement on the measurement resolution provided by the American Federal Aviation Administration (three-seconds wind gusts duration). The benefit in terms of costs are remarkable, based on the average price of an ultrasonic anemometer and of the components used to implement the proposed method.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[Pindado2011] S. Pindado, E. Vega, A. Martinez, E. Meseguer, S. Franchini, and I. Pérez, "Analysis of calibration results from cup and propeller anemometers. Influence on wind turbine Annual Energy Production (AEP) calculations." Wind Energy 2011, 14, 119-132.

[Pindado2014] S. Pindado, J. Cubas, and F. Sorribes-Palmer, "The cup anemometer, a fundamental meteorological instrument for the wind energy industry. Research at the IDR/UPM Institute." Sensors 14.11, 2014, 21418-21452.

[Kristensen1994] L. Kristensen, "Cups, props and vanes." Røskilde, Denmark: Risø National Laboratory, 1994.

[Westermann1996] D. Westermann, "Overspeeding Measurements of Cup Anemometers Compared to a Simple Numerical Model." Deutsches Windenergie-Institut gemeinnutzige GmbH, 1996.

[Hakkarinen1962] W. Hakkarinen, "Cup anemometer." U.S. Pat. No. 3,020,963, 1962.

[Dahlberg2005] J. A. Dahlberg, "Cup anemometer." U.S. Pat. No. 6,895,812, 2005.

[Amman1994] S. K. Amman, "Ultrasonic anemometer." U.S. Pat. No. 5,343,744, 1994.

[Loucks2003] R. B. Loucks, Richard B. "Acoustic anemometer for simultaneous measurement of three fluid flow vector components." U.S. Pat. No. 6,601,447, 2003.

[Nelke2014] C. M. Nelke, and P. Vary, "Measurements, analysis and simulation of wind noise signals for mobile communication devices.", in Proc. Intl. Workshop Acoust. Echo Noise Control (IWAENC), 2014.

[Schwartz2018] 0. Schwartz, and S. Gannot, "A recursive Expectation-Maximization algorithm for online multi-microphone noise reduction.", in Proc. Signal Processing Conference (EUSIPCO), 2018.

[Mirabilii2018] D. Mirabilii, and E. A. P. Habets, "Simulating multi-channel wind noise based on the Corcos model." in Proc. Intl. Workshop Acoust. Echo Noise Control (IWAENC), 2018.

[Corcos1964] G. Corcos, "The structure of the turbulent pressure field in boundary-layer flows.", Journal of Fluid Mechanics, vol. 18, no. 3, pp. 353-378, 1964.

[Mellen1990] R. H. Mellen, "On modeling convective turbulence.", The Journal of Acoustical Society of America, vol. 88, no. 6, pp. 2891-2893, 1990.

[Chase1980] D. Chase, "Modeling the wavevector-frequency spectrum of turbulent boundary layer wall pressure", Journal of Sound and Vibration, vol. 70, Issue I, pp. 29-67, 1980.

[Williams1982] J. E. F. Williams, "Boundary-layer pressures and the Corcos model: a development to incorporate low wavenumber constraint.", Journal of Fluid Mechanics, vol. 125, pp. 9-25, 1982.

[Smolyakov1991] A. V. Smol'yakov, and V. M. Tkachenko, "Model of a field of pseudo sonic turbulent wall pressures and experimental data.", Soviet Physics-Acoustics, vol. 37, no. 6, pp. 627-631, 1991.

[Caiazzo2016] A. Caiazzo, R. D' Amico, W. Desmet, "A generalized Corcos model for modelling turbulent boundary layer wall pressure fluctuation", Journal of Sound and Vibration, vol. 372, pp. 192-210, 2016.

The invention claimed is:

1. A method for characterizing an airflow, comprising:

receiving acoustic signals generated by the airflow by means of a microphone array;

extracting a characteristic information from the acoustic signals by means of an acoustic signal analysis unit;

determining an information on the airflow based on the characteristic information by means of an estimating unit;

wherein the information on the airflow comprises an information regarding a wind speed U and/or a wind direction $\theta_w$;

wherein the determining of the information is based on the characteristic information extracted from the acoustic signals and an expected version of the respective characteristic information; wherein the expected version is determined using the Corcos model, an ad-hoc model or another model; or wherein determining an information is based on a regression or a classification of the characteristic information;

wherein the airflow characterization is used to control or monitor a physical system effected by the airflow including at least one of: vehicle, unmanned aerial vehicle, aerial vehicle, turbine, or meteorological measurement device.

2. The method according to claim 1, wherein the characteristic information comprises a temporal information and/or a spectral information and/or a spatial information and/or a feature.

3. The method according to claim 1, wherein the expected version is determined using the Corcos model which is described by the following formula:

$$\gamma_{12}(k, U, \theta_w) = \exp\left(\frac{-\alpha(\theta_w)\omega_k d}{U_c}\right)\exp\left(\frac{j\omega_k d\cos(\theta_w)}{U_c}\right)$$

where $\omega_k=2\pi kF_s/K$ denotes the discrete angular frequency, K and $F_s$ denote the length of the discrete Fourier transform and the sample frequency respectively, d denotes the microphone distance, $U_c$ denotes the convective turbulence speed, $\alpha(\theta_w)$ denotes a coherence decay parameter.

4. The method according to claim 1, wherein determining the information on the airflow comprises computing an optimal set $[\hat{U}, \hat{\theta}_w]$ by solving the least-square minimization $$[\hat{U}, \hat{\theta}_w] = \underset{[U,\theta_w]}{\operatorname{argmin}} \sum_{k\in K} \left|\tilde{\gamma}_{12}(k) - \gamma_{12}(k, U, \theta_w)\right|^2$$

where the time frame/was omitted by brevity, $\tilde{\gamma}_{12}(k)$ denotes the measured spatial coherence, $\gamma_{12}(k, U, \theta_w)$ denotes the theoretical model.

5. The method according to claim 4, wherein determining the information on the airflow comprises minimizing the Frobenius norm of a composite error matrix given by the difference between a measured spatial coherence matrix and a matrix defined by the Corcos model; and/or wherein determining the information on the airflow comprises computing $$\hat{u} = \underset{u}{\operatorname{argmin}} \sum_{k \in K} \|\Gamma_e(k, \vec{u})\|_F^2$$

where û is an estimated wind propagation vector, $$\|\cdot\|_F^2$$

is the squared Frobenius norm of a matrix and $\Gamma_e(k, \vec{u})$ is defined as $\Gamma_e(k, \vec{u}) = \hat{\Gamma}(k) - \Gamma(k, \vec{u})$, where $\hat{\Gamma}(k)$ is a measured spatial coherence matrix computed from the acoustic signals.

6. The method according to claim 1, wherein the characteristic information is extracted by use of a supervised machine learning approach and/or a deep learning approach and/or by use of a convolutional or fully connected neural network.

7. The method according to claim 1, wherein determining the information on the airflow is performed by mapping the acquired features to measures of an characterized airflow.

8. The method according to claim 1, further comprising isolating wind noise out of the received acoustic signal.

9. The method according to claim 8, wherein isolating the wind noise comprising selecting a frequency range of the acoustic signal, selecting a frequency range lying within the range between 20 Hz to 20 kHz, selecting a frequency range below 2 kHz, below 1.5 kHz, and/or wherein isolating the wind noise comprises filtering.

10. The method according to claim 9, wherein isolating the wind noise further comprises estimating a frequency range of the wind noise, said frequency range to be selected.

11. The method according to claim 9, wherein isolating the wind noise comprising transforming the acoustic signals into the time-frequency domain or another domain.

12. The method according to claim 1, wherein the method further comprises post processing in order to remove outliers.

13. A non-transitory digital storage medium having stored thereon a computer program for performing a method for characterizing an airflow, comprising:

receiving acoustic signals generated by the airflow by means of a microphone array;

extracting a characteristic information from the acoustic signals by means of an acoustic signal analysis unit;

determining an information on the airflow based on the characteristic information by means of an estimating unit;

wherein the information on the airflow comprises an information regarding a wind speed U and/or a wind direction $\theta_w$;

wherein the determining of the information is based on the characteristic information extracted from the acoustic signals and an expected version of the respective characteristic information; wherein the expected version is determined using the Corcos model, an ad-hoc model or another model; or wherein determining an information is based on a regression or a classification of the characteristic information, when said program is run by a computer;

wherein the computer program is further configured, when executed to provide airflow characterization to a physical control or monitoring system effected by the airflow, including at least one of: a vehicle, an unmanned aerial vehicle, aerial vehicle, a turbine, or a meteorological measurement device.

14. An apparatus for characterizing an airflow, comprising:

a microphone array for receiving acoustic signals generated by the airflow;

an acoustic signal analysis unit configured to extract a characteristic information from the acoustic signal; and an estimating unit configured to determine an information on the airflow based on the characteristic information;

wherein the information on the airflow comprises an information regarding a wind speed U and/or a wind direction $\theta_w$;

wherein the determining of the information is based on the characteristic information extracted from the acoustic signals with an expected version of the respective characteristic information; wherein the expected version is determined using the Corcos model, an ad-hoc model or another model; or wherein determining an information is based on a regression or a classification of the characteristic information;

wherein the microphone array comprises a plurality of microphones mounted in the free field with inter microphones spacing, e.g. less than specific spacing or less than 200 mm, 100 mm, or 20 mm, and/or wherein the estimating unit is specifically configured to determine wind speed and/or wind direction for use in controlling or monitoring a physical system effected by the airflow.

15. The apparatus according to claim 14, wherein the microphone array comprises at least three microphones.

16. The apparatus according to claim 14, wherein the microphone comprises a plurality of microphones which are spaced apart from each other by a distance less than 20 mm or less than 15 mm or less than 10 mm or less than 30 mm.

17. The apparatus according to claim 14, wherein the microphone array comprises a plurality of microphones which are arranged in a planar constellation and/or which are mounted in the free field.

18. The apparatus according to claim 14, wherein the apparatus comprises a low-pass filter or transformation unit configured to isolate wind noise out of the acoustic signal.

19. The apparatus according to claim 14, wherein the apparatus further comprises a post processing unit configured to remove outliers.

20. The apparatus according to claim 14, wherein the microphone array is integrated into at least one of: vehicle, unmanned aerial vehicle, aerial vehicle, turbine, or a meteorological measurement device.

* * * * *